Patented Oct. 25, 1932

1,884,954

UNITED STATES PATENT OFFICE

CHARLES V. ZOUL, OF LOS ANGELES, CALIFORNIA, ASSIGNOR TO COEN COMPANIES, INC., OF LOS ANGELES, CALIFORNIA, A CORPORATION OF CALIFORNIA

METHOD OF TREATING CLAY

No Drawing.      Application filed July 20, 1929.  Serial No. 379,887.

This invention relates to certain new and useful improvements in treating clays, earths, and other such minerals for use as an adsorptive and polymerizing agent.

The present invention is concerned with a process of treating clays to be used in decolorizing, clarifying and purifying animal, mineral and vegetable oils, and has for its principal object improvements in the bleaching power and decolorizing efficiency of such clays, as well as to produce a chemical action to effect the resultant oil decolorized, distilled or otherwise processed so as to polymerize the tarry, asphaltic and bituminous substances, unsaturated hydrocarbons and other matter of high molecular weight so that the oil will retain its stability of color, odor and other physical and chemical properties, and to prevent the formation of polymers in the gaseous products produced by distillation.

The word clay is here used in a general sense indicating substances such as bauxite, montmorillonite, gibsite, diaspore, kaolinite, diatomaceous earths and other clays, and similar substances.

In the past it has been proposed, and in some instances methods have been adopted to treat clays with chemicals such as sulphuric acid, alum with iron ore compounds, etc. In these cases the chemical used, as, for instance, sulphuric acid, attacked the clay molecule, chemically disrupting the chemical structure thereof and thus making chemically new substances, such as silica, which are the active substances of the clay. When the clays are heated and treated with alum and iron, a potential sulphuric acid is formed so that a similar effect is produced as when the clay is treated with acid alone.

In these processes, the clays acquire a higher adsorption power, due, no doubt, to the highly colloidal surface of the silica of the clay molecule after the alumina has been removed by the acid. It is presumed that when the clay has been treated with acid to remove the alumina the silica lattice arrangement remains the same as it was in the original clay molecule thus leaving a large atomic silica adsorption surface exposed.

My process contemplates a different, more efficient and less costly method of treatment of the clay and the application is developed with novel combinations of chemicals, under special hydrogen-ion concentrations. I propose to treat the clay with a solution of aluminium chloride under optimum conditions of neutrality, alkalinity or acidity.

The preferred process is as follows: Clay as taken from the mine is crushed to small size; for example, substantially that of a cubic inch. In the event that the clay is excessively alkaline it may be suitably neutralized with acid. It is then sprinkled with the aluminium chloride solution. The solution should be given some time to diffuse throughout the clay. The clay is dried by the ordinary methods used. The drying temperature is to be carefully regulated so that no roasting occurs, but that a slight amount of moisture remains in the clay. A safe test for this operation is that the clay may be dried for a period and at a temperature at which moisture continues to be driven off from it in the form of a visible vapor, but drying should not continue thereafter. The presence of water vapor evolving from the clay prevents roasting or too great rise of temperature. The clay will thus remain damp since it has been found that the most beneficial results are obtained when the clay is in that condition and presents an aluminium chloride moistened surface upon which the coloring matters and gum forming substances may accumulate and at the same time possibly having further beneficial action when introduced into the heated oil at a temperature at which the saturated aluminium chloride will pass off as a vapor. The clay of this consistency is then ground to approximately 200 mesh and packed for shipment.

It may be preferential to properly dry the clay prior to shipment, to the point at which it is to be used, and to then treat it. In some instances, various commercial advantages might be thus obtained, whereby the aforementioned results may be brought about with the use of a relatively smaller amount of clay.

Assuming that we have a clay, neutral to methyl orange, and which has no alkaline water extract, and substantially free from carbonates,—this clay while in a wet or damp state is treated with a solution of chloride of aluminium, a commercial chemical, in the proportion of from 1% to 1½% of weight of the clay. The wet state of the clay may be due either to its natural moisture or to added water in amounts of approximately 10% as desired to obtain rapid diffusion of the treating agent. The aluminium chloride, technically as produced, may be dissolved in water and sprayed upon the moist clay, if desired, or the solid aluminium chloride may be dusted or sprinkled upon the clay.

In any event, this chemical will diffuse throughout the mass of clay, spreading itself over the surface of the particles of the clay. The clay is then dried, as desired, and as will be further explained.

When a clay treated with the chloride of aluminium is added to a petroleum product for bleaching it, or for the inhibition of gum formation, or both, and the temperature of the oil is increased to 212 to 230° F. to remove the residual water, or it is removed by any common method, the aluminium chloride concentrates to such a strength as to form new products of itself, leaving the clay particle intact. The new products formed upon the surface of the clay molecules increase the adsorptive qualities of the molecules and thus have a pronounced power of bleaching and coagulating coloring matters, asphalts, etc., which may be present in the oil. The clay thus treated also has power to polymerize or otherwise change unsaturated hydrocarbons to such a composition that they will not form gums, the presence of which presents one of the main problems of gasoline cracking processes. In the vapor phase step of oil treatment, the aluminium chloride gas which passes off with the hydrocarbon vapors acts to prevent formation of polymers.

Relatively smaller quantities of the clay will be required in treating an oil with such clay, thus materially simplifying the problem of disposing of the spent clay. Furthermore, while such a process is in progress the acidity or alkalinity may be varied to insure the optimum result while treating an oil having particular characteristics.

Clays which are too alkaline or too acid may be neutralized if desired, to their optimum point by means of acids, acid salts, etc. This will not in any way disrupt the structural formation of the clay molecule, as in certain processes proposed in the past; but will merely act to convert alkali salts or alkaline earths,—such as soda, calcium carbonate, magnesium carbonate, etc., to mastive neutral salts, leaving the alumina silicate clay molecule intact.

The process of neutralizing the clay and treating it with aluminium chloride, with which the present invention is concerned, may be carried out separately or in combination, as seems best suited to the varying alkaline conditions of the clay. A sample of the clay may be given a preliminary test for this purpose and a combined reagent prepared to meet the exact needs of a particular clay. As an example, I have treated a clay known as a magnesium clay $(MgO) \pm (SiO_2) \pm$, found in Nye County, Nevada. This clay contains free alkaline carbonates and magnesium and calcium carbonate. Acid was added substantially equal to the alkalinity of the clay, although optimum results may require the condition of neutrality to slightly favor either alkalinity or acidity, as experience may dictate. The aluminium chloride treatment is then carried out. In actual practice, the untreated clay, when used in bleaching certain Ren Engine oils of #5 color value, as commonly standardized in the trade, gave a color value of #3 when thus treated. However, the same clay when so neutralized and then treated with aluminium chloride gave a color value of #2 in the Union Colormeter scale. Another clay that shows no alkalinity, when so treated with 1% by weight of aluminium chloride gave an even greater reduction in color, being a value of #1.18 in the Union Colormeter scale. Due to the nature of the oil or other products to be treated with the prepared clay, it may be found advantageous to use the solid aluminium chloride, either powdered and sifted on clay.

It will thus be seen that the clay product produced as here described, may be efficiently used to decolorize, and prevents formation of those hydrocarbons which in the liquid or vapor phase process of refining hydrocarbons, form gums, and to insure that this may be carried out in a simple operation, and with a minimum required bulk of clay.

Having thus described my invention, what I claim and desire to secure by Letters Patent is:

1. A process of preparing clays for adsorption purposes, which consists in reducing the clay to a desired degree of fineness, thereafter treating the same with an acid to bring to a desired degree of neutrality and then adding aluminium chloride to the mass thus treated.

2. A process of treating clays for adsorption purposes, which consists in reducing clay to a desired degree of fineness, thereafter treating it with an acid to neutralize the alkali therein, then treating it with a solution of aluminium chloride, thereafter partially dehydrating the treated product and then reducing it to a desired degree of fineness for use.

CHARLES V. ZOUL.